US008296575B2

(12) United States Patent
Kiiveri (10) Patent No.: US 8,296,575 B2
(45) Date of Patent: Oct. 23, 2012

(54) METHOD FOR PROTECTING ELECTRONIC DEVICE, AND ELECTRONIC DEVICE

(75) Inventor: Antti Kiiveri, Oulu (FI)

(73) Assignee: Nokia Corporation, Espoo (FI)

(*) Notice: Subject to any disclaimer, the term of this patent is extended or adjusted under 35 U.S.C. 154(b) by 2049 days.

(21) Appl. No.: 10/176,727

(22) Filed: Jun. 21, 2002

(65) Prior Publication Data

US 2003/0009680 A1    Jan. 9, 2003

(30) Foreign Application Priority Data

Jun. 29, 2001  (FI) ..................................... 20011406

(51) Int. Cl.
*G06F 21/00* (2006.01)
(52) U.S. Cl. .......... 713/189; 380/255; 380/277; 380/30; 380/282; 707/687
(58) Field of Classification Search .................. 713/192, 713/194, 189
See application file for complete search history.

(56) References Cited

U.S. PATENT DOCUMENTS

| | | | | |
|---|---|---|---|---|
| 4,275,464 A * | 6/1981 | Schmidt | ........................... | 714/46 |
| 4,941,176 A * | 7/1990 | Matyas et al. | ................. | 380/280 |
| 5,214,700 A * | 5/1993 | Pinkas et al. | ................... | 713/156 |
| 5,224,160 A * | 6/1993 | Paulini et al. | .................. | 713/187 |
| 5,684,757 A * | 11/1997 | Eitrich | ............................ | 368/10 |
| 5,721,781 A * | 2/1998 | Deo et al. | .......................... | 705/67 |
| 5,751,809 A * | 5/1998 | Davis et al. | ..................... | 713/176 |
| 5,799,086 A * | 8/1998 | Sudia | .............................. | 705/76 |
| 5,864,757 A * | 1/1999 | Parker | ............................ | 455/418 |
| 5,913,175 A | 6/1999 | Pinault | ........................... | 455/558 |
| 5,956,408 A * | 9/1999 | Arnold | ........................... | 713/189 |
| 5,991,399 A * | 11/1999 | Graunke et al. | .............. | 380/279 |
| 6,005,942 A * | 12/1999 | Chan et al. | ..................... | 713/187 |
| 6,055,636 A * | 4/2000 | Hillier et al. | ..................... | 726/34 |
| 6,104,928 A * | 8/2000 | Waugh | ........................... | 455/445 |
| 6,122,742 A * | 9/2000 | Young et al. | .................... | 726/10 |
| 6,124,709 A * | 9/2000 | Allwine | ...................... | 324/207.2 |
| 6,124,799 A | 9/2000 | Parker | ....................... | 340/825.34 |
| 6,300,863 B1 * | 10/2001 | Cotichini et al. | .............. | 340/5.8 |

(Continued)

FOREIGN PATENT DOCUMENTS

EP          1 001 640 A1    5/2000

(Continued)

OTHER PUBLICATIONS

Stubblebine, Stuart G. Gligor, Virgili D. "Protocol Design for Integrity Protection" IEEE Computer Society Symposium on Research in Security and Privacy. Pub. Date: May 1993. Relevant pp. 41-53. Found on the World Wide Web on: http://ieeexplore.ieee.org/stamp/stamp.jsp?tp=&arnumber=287644.*

(Continued)

*Primary Examiner* — Nathan Flynn
*Assistant Examiner* — Jeremiah Avery
(74) *Attorney, Agent, or Firm* — Harrington & Smith (57) ABSTRACT

The invention relates to an electronic device, which comprises an operational unit and a user-specific module. Data in the device, necessary for checking the user-specific module, is protected with a key of the encryption method employed by the device manufacturer. A verification key of the encryption method employed by the electronic device manufacturer is stored in the operational unit, by means of which verification key the data necessary for checking the user-specific module is verified.

37 Claims, 4 Drawing Sheets

U.S. PATENT DOCUMENTS

| | | | | |
|---|---|---|---|---|
| 6,328,217 B1 * | 12/2001 | Everett et al. | .................. | 235/492 |
| 6,367,014 B1 * | 4/2002 | Proust et al. | .................. | 713/182 |
| 6,501,949 B1 * | 12/2002 | Singleton | ................... | 455/422.1 |
| 6,557,104 B2 * | 4/2003 | Vu et al. | ......................... | 713/189 |
| 6,694,434 B1 * | 2/2004 | McGee et al. | ................ | 713/189 |
| 6,799,155 B1 * | 9/2004 | Lindemann et al. | ............ | 703/24 |
| 6,829,711 B1 * | 12/2004 | Kwok et al. | .................. | 713/183 |
| 6,980,660 B1 * | 12/2005 | Hind et al. | .................... | 380/282 |
| 7,000,115 B2 * | 2/2006 | Lewis et al. | ................... | 713/176 |
| 7,251,731 B2 * | 7/2007 | Laniepce et al. | .............. | 713/176 |
| 7,359,875 B1 * | 4/2008 | Millette et al. | .............. | 705/36 R |
| 7,430,668 B1 * | 9/2008 | Chen et al. | ................... | 713/187 |

FOREIGN PATENT DOCUMENTS

| | | |
|---|---|---|
| GB | 2335568 | 9/1999 |
| WO | WO 00/72149 | 4/2000 |

OTHER PUBLICATIONS

Mohay, George; Zellers, Jeremy. "Kernel and Shell Based Applications Integrity Assurance". 13th Annual Computer Security Applications Conference. Pub. Date: Dec. 1997. Relevant pp. 34-43. Found on the World Wide Web at: http://ieeexplore.ieee.org/stamp/stamp.jsp?tp=&arnumber=646171.*

"Digital Cellular Communication System (Phase 2+); Personalisation of GSM Mobile Equipment (ME); Mobile Functionality specification (GSM 02.22)", ETSI TS 101 624 V7.0.0, pp. 1-23 XP002155232.

Applied Cryptography, 2nd edition, B. Schneier, 1996, relevant pages thereof.

* cited by examiner

METHOD FOR PROTECTING ELECTRONIC DEVICE, AND ELECTRONIC DEVICE

FIELD OF THE INVENTION

The invention relates to a method for protecting an electronic device.

BACKGROUND OF THE INVENTION

A terminal in a radio system comprises a mobile equipment as an operational unit and a SIM module as a user-specific module, of which the mobile equipment comprises parts required for handling, transmitting and receiving a signal. The SIM module, in turn, comprises a processor and memory resources for processing and storing user data and user interface data.

The mobile equipment and the SIM module can de made mutually compatible such that a particular, single mobile equipment only works with a particular, single SIM module. So, when the mobile equipment is switched on, it locks by means of software to a correct SIM module attached to said mobile equipment. The operator of the user interface for making and receiving calls is determined in the SIM module. This is the case, for instance, when, in connection with the user interface purchase, the operator wishes to provide the user with a mobile equipment that is only usable for calls from the user interface in question. Because the user interface data is stored in the SIM module, it is possible to prevent the mobile equipment from being used with another SIM module, for instance, in another operator's network, by preventing the operation of the mobile equipment if an inappropriate SIM module is attached to the mobile equipment. Therefore, the mobile equipment comprises a program, by which it checks in connection with start-up that the SIM module attached to the terminal equipment is the appropriate one.

However, current SIM module check programs have a drawback that the SIM module check program in the mobile equipment can be altered too easily in such a manner that the mobile equipment is made operable also with other SIM modules than the one intended.

BRIEF DESCRIPTION OF THE INVENTION

The object of the invention is thus to provide an improved method and an electronic device implementing the method, which make it more difficult to alter without authorization data used in checking a user-specific module. This is achieved by a method for protecting an electronic device, which comprises an operational unit and a user-specific module and which is intended to communicate with a radio network, comprising protecting data necessary for checking the user-specific module with a key of an encryption method used by the protection performer; and storing in the operational unit of the electronic device a verification key of the encryption method used by the protection performer for verifying the data necessary for checking the user-specific module.

The invention also relates to a method for protecting an electronic device, which comprises an operational unit and a user-specific module and which is intended to communicate with a radio network. In the method the data in the electronic device, necessary for checking the user-specific module, is encrypted with a key of the encryption method employed by the protection performer, and for verifying the data necessary for checking the user-specific module a verification key of the encryption method employed by the protection performer is stored in the operational unit of the electronic device, and the data necessary for checking the user-specific module is verified by using the verification key of the encryption method, and if the verification fails, the electronic device is at least prevented from being connected to a radio network; the user-specific module is checked by means of the data necessary for checking the user-specific module; and the electronic device is started if the user-specific module check succeeds, or the electronic device is at least prevented from being connected to the radio network if the user-specific module check fails.

The invention further relates to an electronic device, which comprises an operational unit and a user-specific module and which is arranged to communicate with a radio network. The data in the electronic device, necessary for checking the user-specific module, is protected with a key of the encryption method employed by the protection performer, and a verification key of the encryption method employed by the protection performer is stored in the operational unit of the electronic device for verifying the data necessary for checking the user-specific module, and the electronic device is arranged to verify the data necessary for checking the user-specific module by using the verification key of the encryption method, and if the verification fails, to restrict its operation at least by not connecting to the radio network; to check the user-specific module by means of the data necessary for checking the user-specific module; and to start if the user-specific module check succeeds, or to restrict its operation at least by not connecting to the radio network if the user-specific module check fails.

The preferred embodiments of the invention are disclosed in the dependent claims.

The invention is based on the idea that data, which is located in the operational unit of the electronic device and by which is checked compatibility of the user-specific module with the operational unit, is protected with a key of an encryption method. The electronic device verifies authenticity of the data with an encryption method key stored in the operational unit, which key corresponds to the key employed in protecting the data.

Several advantages are achieved by the method and system of the invention. The solution makes it more difficult to alter the user-specific module checking program in the electronic device without authorization. In this manner it is possible to verify who is the originator of the checking program and that the checking program is in its original form.

BRIEF DESCRIPTION OF THE DRAWINGS

In the following, the invention will be described in greater detail in connection with preferred embodiments, with reference to the attached drawings, wherein.

DETAILED DESCRIPTION OF THE INVENTION

In particular, the present solution is applicable to verifying a SIM module check of a portable electronic device capable of operating in a radio network. One device of this kind is e.g. a radio system terminal equipment, without restricting thereto, however.

Figure 1:
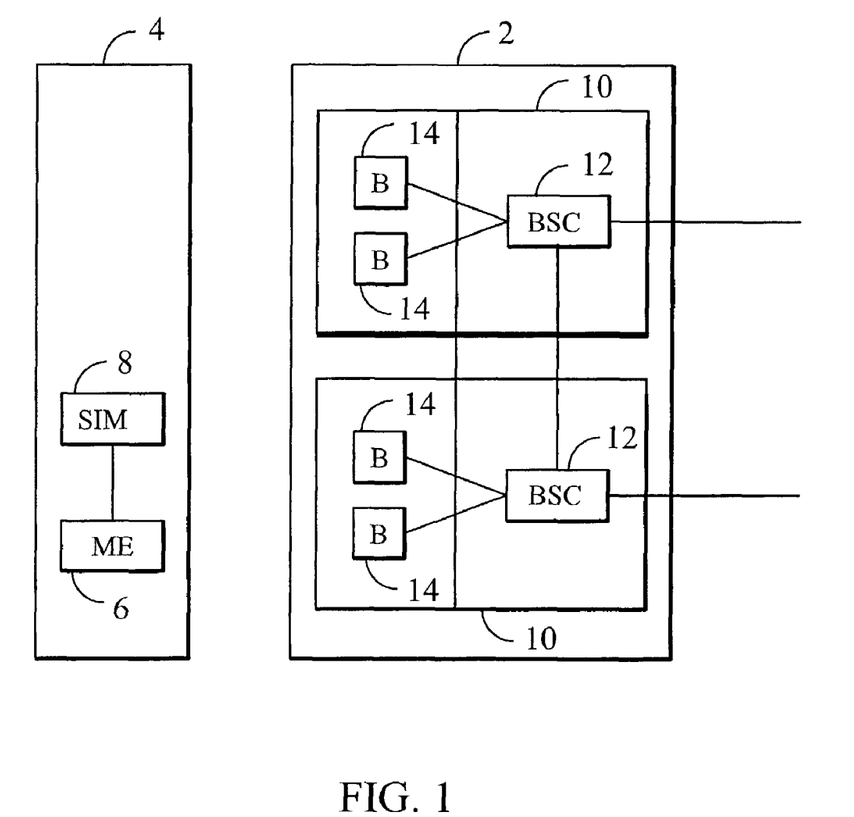
FIG. 1 shows a structure of a mobile system.

With reference to FIG. 1, a structure of a mobile system is described by way of example. The mobile system parts include a terrestrial radio access network 2 of the mobile system and a user equipment UE 4. The user equipment 4 consists of two parts: a mobile equipment ME 6 which serves as an operational unit and whose radio terminal is used to establish a radio connection to the network 2, and a user-specific module, i.e. SIM (Sub-scriber Identity Module) module 8, which is a smart card that contains information on the subscriber's identity and typically performs verification algorithms, stores encryption parameters and subscriber data.

The radio network 2 consists of radio network subsystems RNS 10, which consist of base station controllers 12 and one or more base stations 14. Each base station controller 12 administrates radio resources at the base stations connected thereto.

Figure 2:
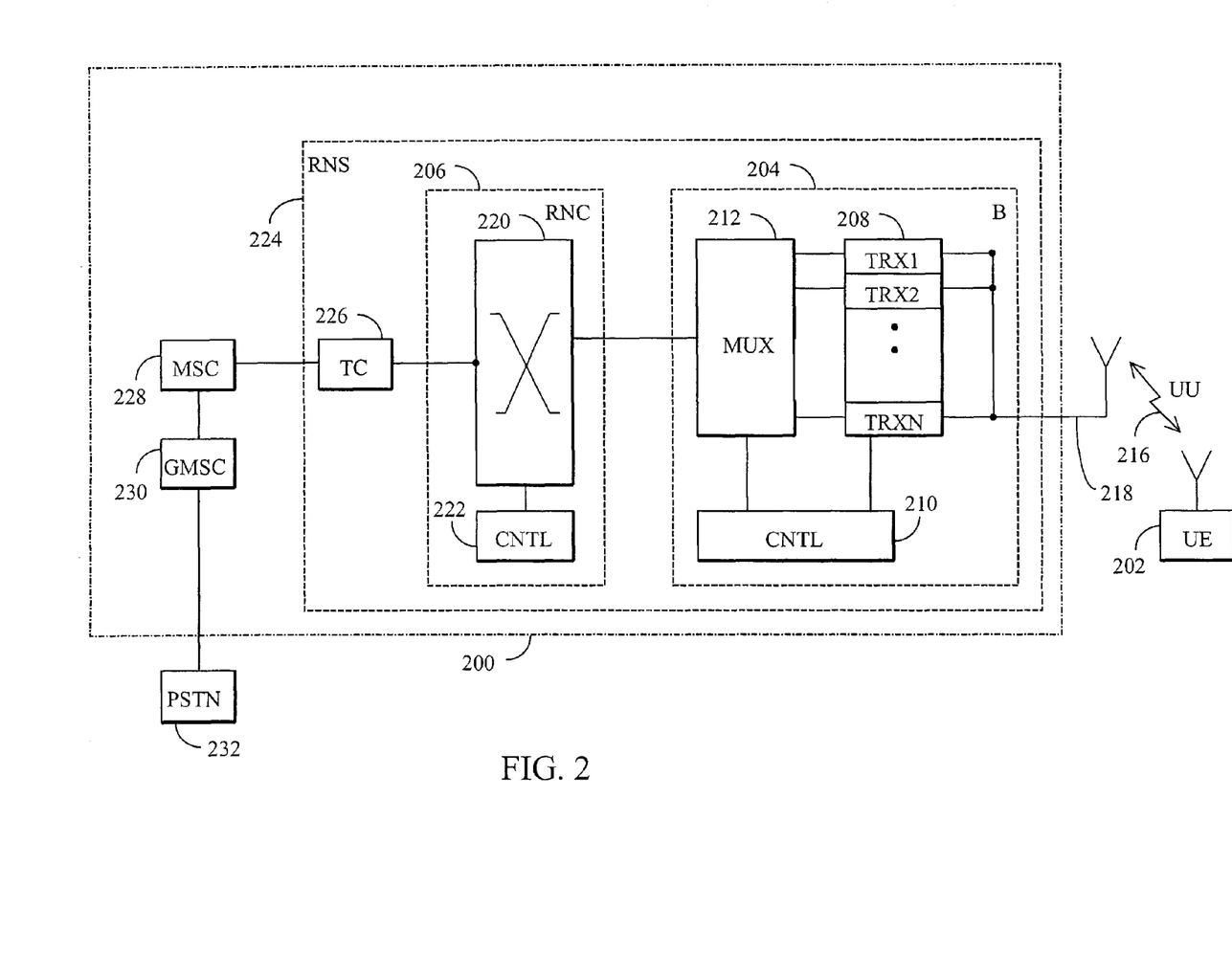
FIG. 2 shows a cellular radio system.

FIG. 1 is depicted on rather a general level, so FIG. 2 gives a more detailed example of a cellular radio system. FIG. 2 only shows the most substantial blocks, but it is apparent to a person skilled in the art that a conventional cellular radio network also comprises other functions and structures that need not be described in greater detail herein. It should also be noted that FIG. 2 only gives one example of the structure.

Thus, the cellular radio network typically comprises a fixed network infrastructure, i.e. a network part 200 (corresponding to the radio network 2 in FIG. 1) and user equipments 202, which can be fixed terminal equipments, terminal equipments located in a vehicle or portable, carry-around terminal equipments. The network part 200 comprises base stations 204. A plurality of base stations 204 are, in turn, controlled in a centralized manner by a radio network controller 206 that communicates therewith. The base station 204 comprises transceivers 408 and a multiplexer unit 212.

The base station 204 further comprises a control unit 210 which controls the operation of the transceivers 208 and the multiplexer 212. The multiplexer 212 is used to place traffic and control channels used by a plurality of transceivers 208 onto one transmission link 214.

The transceivers 208 of the base station 204 have a connection to an antenna unit 218, by which a bidirectional radio connection to the user equipment 202 is implemented. The structure of frames to be transmitted on the bidirectional connection 216 is defined system-specifically. In preferred embodiments of the invention, at least part of the signal is transmitted by using three or more transmission antennas or three or more antenna beams provided by a plurality of transmission antennas.

The radio network controller 206 comprises a group switching field 220 and a control unit 222. The group switching field 220 is used for switching speech and data and for connecting signalling circuits. The radio network subsystem 224 consisting of the base station 204 and the radio network controller 206 also comprises a transcoder 226. Generally, the transcoder 226 is located as close to a mobile switching centre 228 as possible, because speech can then be transmitted in the cellular-radio-network form between the transcoder 226 and the radio network controller 206 saving transmission capacity.

The transcoder 226 converts the different digital coding formats of speech used between the public switched telephone network and the mobile network to be mutually compatible, for instance, from the fixed network format into any cellular radio network format, and vice versa. The control unit 222 performs call control, mobility management, collecting of statistics and signalling.

FIG. 2 also shows a mobile services switching centre 228 and a gateway mobile services switching centre 230, which takes care of the mobile system connections to the outside world, in this case to the public switched telephone network 232.

Figure 3:
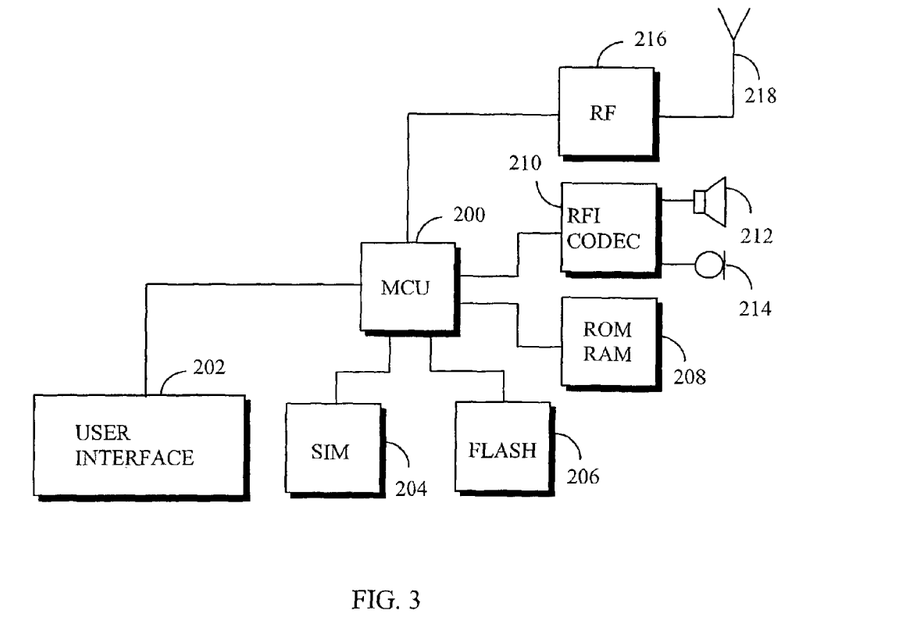
FIG. 3 shows a terminal equipment as an example of an electronic device.

FIG. 3 is now used to study a GSM-system terminal equipment as an example of the electronic device, the terminal equipment comprising a mobile equipment (blocks 200, 202, 206 to 218) as an operational unit and a SIM module as a user-specific module 204. The terminal equipment comprises a processor 200, in which the software operations of the terminal equipment are performed. For instance, the processor 200 takes care of digital signal treatment and controls the operation of other blocks. The user controls the electronic device and enters data with the terminal equipment's user interface 202 (display and keypad), and visual information, such as text and images, treated by the processor 200 is displayed to the user with the user interface. The processor 200 also checks the SIM module 204. Data, such as data related to check release between the SIM module and the electronic device, required by the processor 200 is stored in a flash memory 206. The flash memory 206 is erasable and it can be reflashed. This decision is generally made by the operator, when deciding to unlock the locking between the mobile equipment and the SIM module. The contents of the flash memory can also be altered, when the mobile equipment is resold. In that case, a decision on the alteration is made by the operator or the manufacturer of the mobile equipment. For the processor 200, the terminal equipment also comprises ROM and RAM memory 208 intended for other purposes. A codec block 210 converts the signal arriving from the processor 200 to be suitable for a loudspeaker 212, and the codec block 210 converts the signal arriving from the microphone 214 to be suitable for the processor 200. An RF block 216, in turn, converts the transmitted digital signal arriving from the processor 200 into an analog, radio-frequency signal, so that the signal can be transmitted as electromagnetic radiation via an antenna 218. Correspondingly, the radio-frequency signal received by the antenna 218 is converted to a lower frequency and is digitized in the RF block 216 prior to applying to the processor 200.

The user-specific module, in the terminal equipment a SIM module, is a smart card which comprises a microprocessor and memory. Operational unit data, personal data of the user and identification data of the user interface are stored in the memory of the SIM module. These data are e.g. in IMEI (International Mobile Equipment Identity) and IMSI (International Mobile Subscriber Identity) codes, of which the IMEI code comprises a serial number, an assembly code and a type approval code and the IMSI code comprises a subscriber identifier, an MNC (Mobile Network Code) and an MCC (Mobile Country Code). Therefore, if the terminal equipment has no SIM module or if the terminal equipment has an inappropriate SIM module for the mobile equipment, it is not possible to make ordinary calls with the terminal equipment, and in that case only emergency calls are possible.

Figure 4:
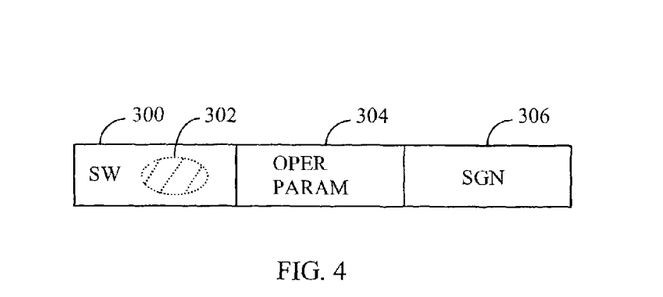
FIG. 4 illustrates data protection.

FIG. 4 is now used to study the method of the solution in a radio system. The terminal equipment comprises programs 300, according to which the terminal equipment operates. The programs 300 comprise a program 302, by which the compatibility between the SIM module and the mobile equipment is checked. Generally, the program 302 checks the compatibility between the user-specific module and the operational unit. The mobile equipment manufacturer stores the programs 300 in the mobile equipment at the manufacturing stage. The default is that if the program 302 finds the SIM module inappropriate, the operation of the terminal equipment is prevented. But if the program 302 finds the SIM module appropriate, the terminal equipment operates. In this manner the SIM module and the mobile equipment are interlocked. The program 302 is known per se. The program 302 checks the SIM module for the IMSI code, for instance. Block 304 comprises parameters determining the operator. By means of the IMSI code it is possible, for instance, to determine a network and a country using the MNC (Mobile Network Code) and the MCC (Mobile Country Code) comprised by the IMSI code. It is substantial in the presented solution that the data necessary for checking the SIM module is protected by an efficient encryption method at the manufacturing stage of the terminal equipment. The data necessary for checking the SIM module refers at least to the program 302. Instead of protecting the checking program 302 alone, it is possible to protect the whole program block 300 or blocks 300 and 304 as shown in FIG. 4. By way of example, FIG. 4 illustrates protection by signature 306.

One efficient way to protect the data necessary for checking the SIM module is to use any encryption method known per se. In this document, encryption and cryptography refer to encrypting or signing data. Known encryption methods include various secret key encryption methods and public key encryption methods. The secret key encryption method is also referred to as symmetric cryptography, because the same key is used for both encryption and decryption. In this case, the data encryptor and the data receiver know the secret key, i.e. the personal key. The public key encryption, in turn, is called asymmetric cryptography, because data encryption is performed with a public key, but data decryption is often performed with a secret key. In the public key encryption method it is also possible to encrypt the data with a secret key and decrypt the data with a public key, in which case only the data encryptor knows the secret key, while the data receiver knows the public key, with which the data can be decrypted.

The public key encryption method can also be used as a signature, whereby the data itself is not encrypted but its authenticity, i.e correctness, can be verified. Thus, the desired data is signed with the protector's secret key that is only known to the protector. The signature is carried out by a mathematical operation between the data and the secret key, and the signature is appended to the data. When the data receiver wishes to be sure of the authenticity of the transmitted data, the receiver uses the public key in a manner known per se for checking the relation between the signature and the data. If the signature verifies the data, the data is transmitted by the signer. But if the signature and the data do not correspond, the data does not originate from the signer.

A commonly used verification method of data authenticity is MAC cryptography (Message Authentication Cryptography). By a MAC algorithm together with an encryption key the data is converted into MAC data that is transmitted or supplied to a verifier together with the original, unconverted data. This can be presented by a formula X=MAC(K,d), where X represents MAC data, MAC( ) represents a MAC operation, K is the encryption key and d is data. When the verifier knows the encryption key, which is also the verification key, the authenticity of the original data can be verified. The verification is performed such that the receiver converts the received data d, with the encryption key K by a MAC algorithm into MAC data $X_r$ and compares the obtained result $X_r$ with the received MAC data X. If the results match ($X_r$=X), it can be assumed that the received data is authentic. But if the results do not match ($X_r \neq X$), the received data is not authentic. Various data protection solutions are described in greater detail in the publication *Applied Cryptography*, B Schneider, second edition, 1996, which is incorporated herein as reference. The encryption method used in the presented solution are known per se, and therefore they are not discussed in greater detail herein.

Figures 5A, 5B:
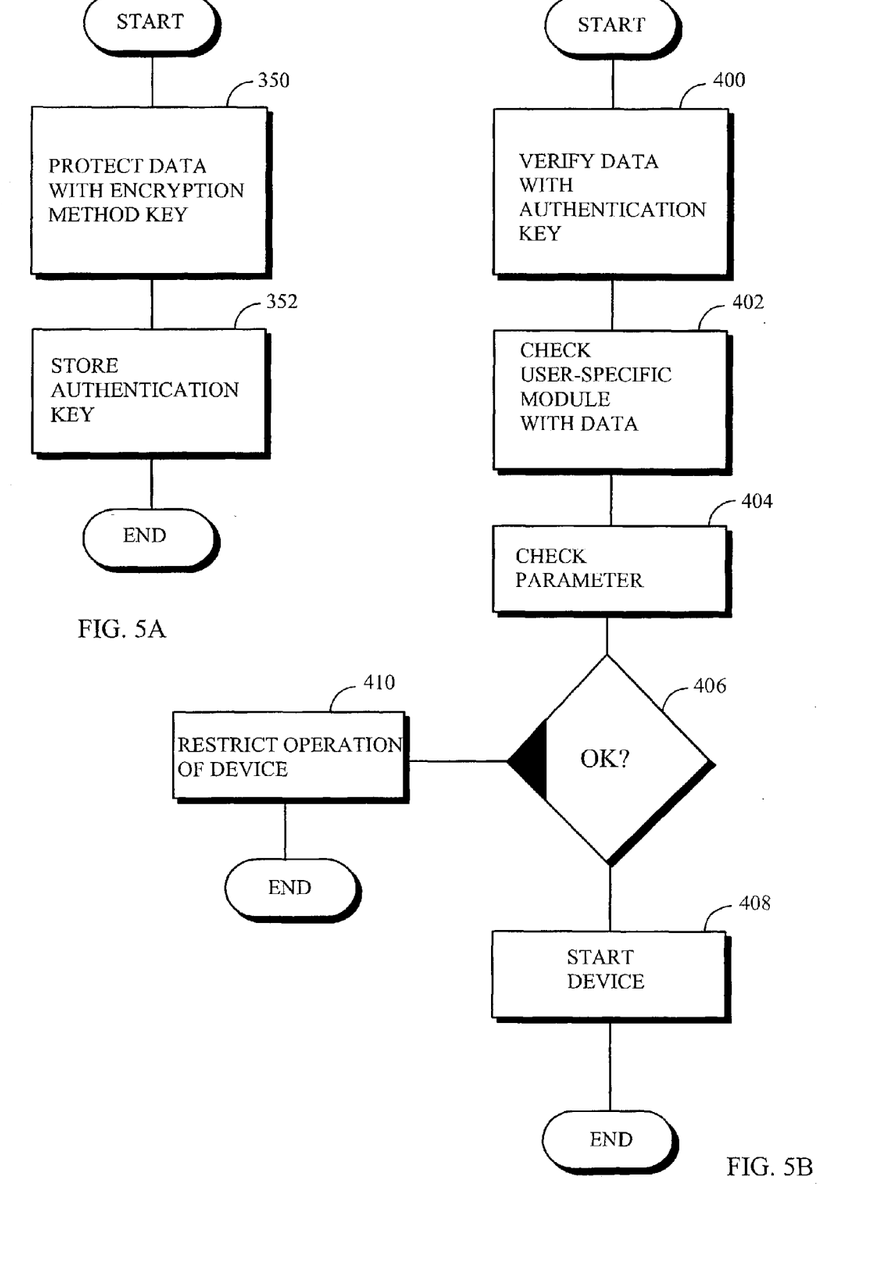
FIG. 5A is a flow chart of measures to be performed prior to use.
FIG. 5B is a flow chart of measures during use.

FIG. 5A is now used to study protection measures provided at the manufacturing stage of the device. Data necessary for checking the user-specific module is stored in the electronic device. The data is protected with a key of the encryption method employed by the electronic device manufacturer in block 350. Instead of the manufacturer, the protection performer can also be any other certifying authority prior to selling the device. Instead of the manufacturer, this certifying authority can be the operator. Cryptography is discussed in greater detail in the publication *Applied Cryptography*, B Schneider, second edition, 1996. In addition to the verification of the data necessary for checking the user-specific module, a verification key of the encryption method employed by the manufacturer is stored in the electronic device in block 352.

Protection can be performed by a public key encryption method. The protection of the data necessary for checking the user-specific module can thus be performed by signing the data necessary for checking the user-specific module with a secret key of the public key encryption method employed by the electronic device manufacturer. In this case, the public key of the manufacturer is stored in the electronic device for verifying the signature of the data necessary for checking the user-specific module. The public key is stored in the memory that cannot be altered. The memory can be a ROM memory (Read Only Memory), for instance. Alternatively, the data necessary for checking the user-specific module is encrypted by the public key encryption method using the secret key of the electronic device manufacturer. In this case, the public key of the encryption method employed by the electronic device manufacturer is stored in the electronic device for decrypting the data necessary for checking the user-specific module.

The protection of the data necessary for checking the user-specific module can also be performed by the MAC encryption method. In this case, for verifying the data necessary for checking the user-specific module a MAC encryption key is stored in the operational unit 6 of the electronic device to serve as a verification key.

It is also possible to combine different protection methods and to provide an electronic envelope, for instance. The data necessary for checking the user-specific module can first be protected utilizing symmetric cryptography, and thereafter the data necessary for checking the user-specific module and protected by the symmetric cryptography is further protected with a key of the public key encryption method or by utilizing MAC cryptography.

The method of the presented solution is now studied by means of FIG. 5B. During the use of the electronic device, correctness of the data necessary for checking the user-specific module is verified by using an encryption method key, which is shown in block 400. Verification takes as long as necessary for its completion, or if verification cannot be performed or it fails, the operation of the terminal equipment is restricted at least by blocking its attachment to the radio network, whereby the terminal equipment is unable to establish a connection to the radio network. If the verification fails, it is also possible to block the operation of the electronic device completely. This applies to all verifications that are carried out in the presented solution. The encryption method is preferably a public key encryption method, whose public key is used for verifying the authenticity of the data. Thereafter the user-specific module is checked by means of the data necessary for checking the user-specific module, which is shown in block 402. Thereafter, it is possible to check in block 404, whether a user-specific-module-check-OK parameter is stored in the operational unit of the electronic device, which parameter always defines the user-specific module check as successful, irrespective of the actual check. For the presented solution, block 404 is not necessary, however. Finally, it is checked whether the user-specific module check succeeded, or not, in block 406. In block 408 the electronic device is started if the user-specific module check succeeds. For instance, the check succeeds in the terminal equipment, when the IMEI and IMSI codes of the SIM module satisfy the conditions of the protected checking program. Or alternatively, the operation of the electronic device is blocked in block 410, if the user-specific module check fails. For instance, in the terminal equipment a failure in the check means that the IMEI and IMSI codes of the SIM module do not satisfy the conditions of the protected checking program.

If the data in the electronic device, necessary for checking the user-specific module, is protected by a signature generated with a secret key of the public key encryption method, the authenticity of the data necessary for checking the user-specific module is verified by checking the signature using the public key of the public key method.

If the data in the electronic device, necessary for checking the user-specific module, is encrypted with a secret key of the public key encryption method, the authenticity of the data necessary for checking the user-specific module is verified by decrypting the data necessary for checking the user-specific module with the public key.

If a signature is used in protecting the data necessary for checking the user-specific module, the user-specific module check is carried out such that a signature check sum and a data check sum are formed in a manner known per se, and the check sums are compared with each other. Checking of the terminal equipment is continued if the check sums are identical. Alternatively, the terminal equipment is prevented from connecting to the radio network, or the operation of the terminal equipment is prevented completely, if the check sums differ from each other.

If the MAC encryption method is used in protecting the data necessary for checking the user-specific module, the data necessary for checking the user-specific module is verified with a key of the MAC encryption method.

In the presented solution, the data necessary for checking the user-specific module comprises at least a program for checking the user-specific module. In addition, when the electronic device is a terminal equipment whose user-specific module is a SIM module, the data necessary for checking the SIM module also includes an operator identifier.

If it is desired that compatibility between the mobile equipment and the SIM module is not important, but the mobile equipment can be used independently of the SIM module, the effect of the checking measure can be cancelled and the terminal equipment starts irrespective of the check result. The mobile equipment comprises a public key of the public key encryption method employed by the operator, the public key being protected by a secret key of the public key encryption method employed by the electronic device manufacturer. Instead of the public key, the mobile equipment may have verifying data on the key (for instance a check sum obtained by a hash function), on the basis of which it is possible to verify that the public key is correct. The effect of the check is cancelled on receiving a signal that comprises the SIM-module-check-OK parameter, which is protected with a secret key of the public key encryption method employed by the operator. The correctness of the parameter is verified by using the public key of the public key encryption method used by the operator and stored in the mobile equipment. If the protection is performed by signing the parameter with the secret key of the public key encryption method of the operator, the correctness of the parameter is verified by checking the signature using the public key of the public key encryption method of the operator. But if the protection is performed by encrypting the parameter with the secret key of the public key encryption method of the operator, the correctness of the parameter is verified by decryption with the public key of the public key encryption method. If the protection is performed by MAC encryption method, the parameter is verified with a key of the MAC encryption method.

The verified parameter is entered in the flash memory. When the mobile equipment checks the SIM module, the flash memory is checked, and if the flash memory has the SIM-module-check-OK parameter, the terminal equipment is started, controlled by the parameter, irrespective of the checking result. The signal can be received via the terminal equipment antenna as a radio frequency signal which is transmitted over the radio network, for instance. The parameter data can also be entered in the mobile equipment in connection with servicing or purchasing, for instance. Even though in this paragraph, the given example only relates to a terminal equipment whose SIM module check result is bypassed, this solution that bypasses the SIM module check result can also be applied to other electronic devices.

Instead of performing the encrypting or decrypting measures according to the presented solution without protection in a processor 200, the checking of the user-specific module can be performed in a so-called security state. It is possible to store in the security state of the electronic device both the encrypted data necessary for checking the user-specific module and a key of the encryption method for verifying the data necessary for checking the user-specific module. Likewise, when the electronic device is a terminal equipment whose user-specific module is a SIM module, it is possible to store in the security state of the terminal equipment the data necessary for checking the SIM module and the key of the encryption method for verifying the data necessary for checking the user-specific module. In this case, the correctness of the data necessary for checking the user-specific module is also verified in the security state.

The security state can be implemented in a manner known per se as a protected processor, physically apart from the main processor, having a required amount of non-volatile, reprogrammable memory for the necessary programs. The security state can also be integrated in the same circuit solution as the actual control unit with its main processor and memories. The circuit solution is then generally implemented as a client-specific ASIC circuit. The security state of this kind can also be referred to as a security module. However, the manufacturing costs are in proportion to the amount of non-volatile, yet reprogrammable memory required by the security state, which increases the costs of the client-specific circuit solution manufactured in this manner as compared with the circuit solution implemented without the security state.

Alternatively, the security state can be implemented in a manner known per se also as a security state that is separate from the ordinary state of the device's main processor and where only particular functions allowed in the security state can be performed. No other, separate processor is needed in this operating state to carry out said security state functions.

Even though the invention is described above with reference to the example of the attached drawings, it is apparent that the invention is not restricted thereto, but it can be modified in a variety of ways within the scope of the inventive idea disclosed in the attached claims.

What is claimed is:

1. A method for protecting, an electronic communication device having an operational unit and a user-specific module, comprising storing, at a time prior to a first use of the electronic communication device by a user associated with the user-specific module, a checking program for checking the user-specific module in the operational unit, the checking program being used to check compatibility of the user-specific module with the operational unit;

protecting, at the time prior to the first use of the device, the checking program with a key of an encryption method for use by a protection performer; and storing, at the time prior to the first use of the device, in the operational unit, a verification key of the encryption method used by the protection performer for verifying the authenticity of the checking program so that the authenticity of the checking program can be verified before being used for checking the compatibility of the user-specific module with the operational unit making altering of the checking program and unauthorized use of the electronic communication device more difficult.

2. The method according to claim 1, further comprising:

performing the protection of the checking program with a secret key of a public key encryption method used by the protection performer; and storing the public key of the public key encryption method in the operational unit to serve as the verification key.

3. The method according to claim 1, further comprising performing the protection of the checking program by signing the checking program by a public key encryption method using a secret key of the protection performer; and storing in the operational unit of the electronic device the public key of the public key encryption method employed by the protection performer for verifying the signature of the checking program to serve as the verification key.

4. The method according to claim 1, further comprising performing the protecting of the checking program by encrypting the checking program by a public key encryption method using a secret key of the protection performer; and storing in the operational unit of the electronic device the public key of the public key encryption system employed by the protection performer for decrypting the checking data to serve as the verification key.

5. The method according to claim 1, further comprising protecting of the checking program by a MAC encryption method, and storing a key of the MAC encryption method in the operational unit for verifying the checking program to serve as the verification key.

6. The method according to claim 1, wherein the user-specific module is a SIM module, and wherein the checking program is stored in a security state of the electronic communication device in the encrypted form, and wherein the verification key of the encryption method is stored in the security state of the electronic device for verifying the checking program.

7. A method for checking an electronic communication device having an operational unit and a user-specific module wherein a checking program is stored in the operational unit for checking the user-specific module, the checking program being stored in the operational unit at a time prior to a first use of the electronic communication device by a user associated with the user-specific module, the checking program being used to check compatibility of the user-specific module with the operational unit and wherein the checking program is encrypted, at the time prior to the first use of the electronic communication device, with a key of an encryption method for use by a protection performer, and further wherein a verification key of the encryption method is stored in the operational unit for use by the protection performer for verifying the checking program, the verification key being stored in the operational unit at the time prior to the first use of the electronic communication device; the method further comprising:

verifying the correctness of the checking program by using the verification key of the encryption method so that the authenticity of the checking program can be verified before being used for checking the compatibility of the user-specific module with the operational unit making altering of the checking program and unauthorized use of the electronic communication device more difficult, and if the verification fails, at least preventing the electronic communication device from being connected to a radio network;

if the verification is successful, checking the user-specific module by means of the checking program; and if the user-specific module check succeeds, starting the electronic communication device or if the user-specific module check fails at least preventing the electronic communication device from being connected to the radio network.

8. The method according to claim 7, wherein the checking program is protected by a public key encryption method using a secret key of the protection performer, and further wherein the public key of the public key encryption method is stored in the operational unit of the electronic device for verifying the checking program; the method comprising verifying the checking program by using the public key of the public key encryption method.

9. The method according to claim 8, wherein the checking program, is protected with a signature that is provided by the public key encryption method using the secret key of the protection performer, and wherein the checking program is verified by checking the signature using the public key of the public key method.

10. The method according to claim 8, wherein the checking program, is encrypted by the public key encryption method using the secret key of the protection performer, and further wherein the checking program is verified by decrypting the checking program necessary for checking the user-specific module by means of the public key of the public key method.

11. The method according to claim 7, wherein the checking program, is protected by a MAC encryption method, and wherein;

the program is verified with a key of the MAC encryption method.

12. The method according to claim 7, wherein the user specific module is a SIM module, and the checking program is used for checking the SIM module, wherein the checking program is stored in a security state of the electronic communication device for verifying the checking program, and further wherein the verification of the checking program is performed in the security state.

13. The method according to claim 7, wherein the user-specific module is a SIM module, and the checking program checks the checking program and checks for an operator identifier.

14. The method according to claim 9, wherein the user-specific module is checked by comparing a signature check sum with a program check sum; and if the check sums tally, the electronic device is started, or if the check sums do not tally, at least the connection of the electronic device to the radio network is blocked.

15. The method according to claim 7, wherein the user-specific module is a SIM module, and the electronic communication device includes a verification key of an encryption method of an operator, said verification key being protected with a key used by the protection performer, the method comprising:

starting the terminal equipment irrespective of the SIM module check comprises the steps of:

receiving a signal which comprises a SIM-module-check-OK parameter, which is protected with a key of the encryption method employed by the operator and which controls the terminal equipment to start irrespective of the SIM module check result;

verifying the parameter by using a verification key; and storing the SIM-module-check-OK parameter in the mobile equipment.

16. The method according to claim 15, wherein the parameter is protected by signing it with a secret key of the encryption method employed by the operator, the method comprising verifying the correctness of the parameter by checking the signature with a public key of the encryption method.

17. The method according to claim 15, wherein the parameter is protected by encrypting it with a secret key of the encryption method employed by the operator, the method comprising verifying the correctness of the parameter by decrypting it with a public key of the encryption method.

18. The method according to claim 15, further comprising performing the protection by a MAC encryption method, and verifying the parameter with a key of the MAC encryption method.

19. The method according to claim 15, further comprising checking the SIM-module-check-OK parameter for the terminal equipment start-up.

20. The method according to claim 1 wherein the protection performer is the electronic device manufacturer.

21. An electronic communication device, having an operational unit and a user-specific module comprising:

a checking program adapted to cause the operational unit to check the user-specific module, the checking program being stored in the operational unit at a time prior to a first use of the electronic communication device by a user associated with the user-specific module, the checking program being used to check compatibility of the user-specific module with the operational unit, wherein the checking program is protected, at the time prior to the first use of the electronic communication device, with a key of an encryption method employed by a protection performer, and wherein a verification key of the encryption method is stored in the operational unit for verifying the checking program, the verification key being stored in the operational unit at the time prior to the first use of the electronic communication device, and wherein the operational unit is further caused:

to verify the correctness of the checking program by using the verification key of the encryption method so that the authenticity of the checking program can be verified before being used for checking the compatibility of the user-specific module with the operational unit making altering of the checking program and unauthorized use of the electronic communication device more difficult, and if the verification fails, to restrict its operation at least by not connecting to the radio network; and if the verification is successful, to check the user-specific module by means of the checking program; and start the electronic communication device, if the user-specific module check succeeds, or to restrict its operation at least by not connecting to the radio network, if the user-specific module check fails.

22. The device according to claim 21, wherein the checking program is protected by a public key encryption method using a secret key of the protection performer, and a public key of the public key encryption method employed by the protection performer is stored in the operational unit of the electronic device for verifying the checking program; and the electronic communication device is arranged to verify the checking program by using the public key of the public key encryption method.

23. The device according to claim 22, wherein the checking program, is protected by a signature, which is provided by the public key encryption method using the secret key of the protection performer; and the electronic communication device is arranged to verify the checking program by checking the signature with the public key of the public key method.

24. The device according to claim 22, wherein the checking program, is encrypted by the public key encryption method, using the secret key of the protection performer, and the electronic communication device is arranged to verify the program necessary for checking the user-specific module by decrypting the checking program by means of the public key of the public key encryption method.

25. The device according to claim 21, wherein the program in the electronic device, necessary for checking the user-specific module is protected by a MAC encryption method, and the electronic communication device is arranged to verify the program necessary for checking the user-specific module with a key of the MAC encryption method.

26. The device according to claim 21, wherein the user-specific module is a SIM module, and the checking program and a key of the encryption method are stored in a security state of the electronic communication device; and the operational unit is arranged to verify the checking program in the security state.

27. The device according to claim 21, wherein the user-specific module is a SIM module, and the checking program checks the user-specific module and an operator identifier.

28. The device according to claim 23, wherein the operational unit is arranged to check the user-specific module by comparing a check sum of the signature with a check sum of the checking program; and if the check sums tally, the electronic communication device is arranged to continue the check, or if the check sum do not tally, the electronic device is arranged to restrict its operation at least by not connecting to the radio network.

29. The device according to claim 21, wherein the user-specific module is a SIM module, and the operating unit includes a verification key of an encryption method employed by an operator, which operator verification key is protected with a key of the encryption method employed by the protection performer, and wherein the SIM module check is ignored if the operational unit is arranged to receive a signal which comprises a SIM-module-check-OK parameter, which is protected with the key of the encryption method of the operator and which allows the operational unit to start irrespective of the SIM module check result;
the operational unit is arranged to verify the parameter by using the operator verification key; and
the operational unit is arranged to store the parameter in the electronic communication device.

30. The device according to claim 29, wherein the parameter is protected by signing the parameter with a secret key of the encryption method employed by the operator, and the operational unit is arranged to verify the parameter by checking the signature using a public key of the encryption method.

31. The device according to claim 29, wherein the parameter is protected by encrypting the parameter with a secret key of the encryption method employed by the operator, and the operational unit is arranged to verify the parameter by decryption with a public key of the encryption method.

32. The device according to claim 29, wherein the protection is performed by a MAC encryption method, and
the operational unit is arranged to verify the parameter with a key of the MAC encryption method.

33. The device according to claim 29, wherein the operational unit is arranged to check the SIM-module-check-OK parameter for the mobile equipment start-up.

34. The device according to claim 21, wherein the protection performer is an electronic communication device manufacturer.

35. An apparatus comprising:
an operational unit and a user-specific module, configured to communicate with a radio network; and wherein data used to check compatibility of the user-specific module with the operational unit is stored in the operational unit at a time prior to the first use of the apparatus by a user associated with the user-specific module, the data being protected, at the time prior to the first use of the apparatus, with a key of an encryption method employed by a protection performer;
a verification key of the encryption method employed by the protection performer is stored in the operational unit of the user equipment for verifying the correctness of the data in the operational unit necessary for checking the user-specific module, the verification key being stored in the operational unit at the time prior to the first use of the apparatus;
the apparatus is configured to verify the data necessary for checking the user-specific module by using the verification key of the encryption method so that the authenticity of the checking program can be verified before being used for checking the compatibility of the user-specific module with the operational unit making altering of the checking program and unauthorized use of the apparatus more difficult;
if the verification fails, to restrict operation of the apparatus, at least by not connecting to the radio network;
if the verification is successful, to check the user-specific module by means of the data necessary for checking the user-specific module; and
to start the apparatus, if the user-specific module check succeeds, or to restrict its operation at least by not connecting to the radio network if the user-specific module check fails.

36. The apparatus according to claim 35, wherein the user-specific module is a SIM module, and the checking program and a key of the encryption method are stored in a security state of the apparatus; and the operational unit is arranged to verify the checking program in the security state.

37. A computer program product stored in the memory of an electronic communication device comprising computer readable code that, when executed in the electronic communication device, performs the method according to claim 1.

* * * * *